United States Patent
Sih et al.

(10) Patent No.: US 6,278,775 B1
(45) Date of Patent: *Aug. 21, 2001

(54) METHOD AND APPARATUS FOR DETECTING FACSIMILE TRANSMISSION

(75) Inventors: Gilbert C. Sih; Johnny K. John, both of San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/266,521

(22) Filed: Mar. 11, 1999

Related U.S. Application Data

(63) Continuation of application No. 08/751,190, filed on Nov. 15, 1996, now Pat. No. 5,892,816.

(51) Int. Cl.[7] .............................. H04M 11/00; H04N 1/32
(52) U.S. Cl. ................................ 379/100.17; 379/93.09; 379/100.15; 455/557; 358/442
(58) Field of Search ................. 379/93.05–93.09, 379/93.11, 93.14, 93.15, 100.01, 100.12, 100.13, 100.15–100.17; 455/557, 556; 358/400, 434–436, 442, 468

(56) References Cited

U.S. PATENT DOCUMENTS

| | | | |
|---|---|---|---|
| 5,022,071 | 6/1991 | Mozer et al. | 379/93 |
| 5,117,453 | 5/1992 | Piasecki et al. | 379/100.17 |
| 5,267,301 | 11/1993 | Nishii | 379/100.15 |
| 5,323,398 | 6/1994 | Wake et al. | 379/100.17 |
| 5,448,378 | 9/1995 | Matsumoto | 358/468 |
| 5,450,472 | 9/1995 | Brax | 379/100.17 |
| 5,892,816 | * 4/1999 | Sih et al. | 379/100.17 |

FOREIGN PATENT DOCUMENTS

| | | | |
|---|---|---|---|
| 2169174 | 7/1986 | (GB) | H04L/27/02 |

OTHER PUBLICATIONS

"Recommendation V.21" CCITT 1984, pp. 65–69.

* cited by examiner

*Primary Examiner*—Wing F. Chan
(74) *Attorney, Agent, or Firm*—Philip Wadsworth; Pavel Kalousek

(57) ABSTRACT

A novel and improved method and apparatus for providing an interface to a digital wireless telephone system compatible with standard analog wire line telephones and analog wire line fax machines is disclosed. During a telephone call, a fax detector monitors the incoming data for fax signals. If a fax is detected, the data processor switches from processing the data as if it were voice to processing it as fax In addition, the remote station is sent a signal notifying it to process the data as fax rather than voice. The fax detector operates by detecting the preamble of a V.21 message, present at the beginning of every fax call. Energy is measured in both frequencies of the BFSK signals. A decision is made by analyzing these energies and locating a specific pattern which repeats itself a sufficient number of times.

16 Claims, 3 Drawing Sheets

METHOD AND APPARATUS FOR DETECTING FACSIMILE TRANSMISSION

This is a continuation application of Ser. No. 08/751,190, filed Nov. 15, 1996, now U.S. Pat. No. 5,892,816, entitled "Method and Apparatus for Detecting Facsimile Transmission".

BACKGROUND OF THE INVENTION

I. Field of the Invention

The present invention relates to communications systems. More particularly, the present invention relates to a novel and improved method for automatically detecting a fax call and providing the correct service option based on that detection.

II. Description of the Related Art

Digital wireless telephone systems allow information to be exchanged more efficiently than analog wireless telephone systems. This increased efficiency allows a greater number of telephone calls or other communications to be conducted over digital wireless telephone systems using a given amount of radio frequency (RF) bandwidth. A prominent example of an analog wireless telephone system is the AMPS cellular telephone system employed extensively throughout the United States.

In some instances, the increased efficiency provided by digital wireless telephone systems is so substantial that digital wireless telephone service becomes economically competitive with the traditional analog wire line telephone service. Analog wire line telephone service is the telephone service provided using the conventional wire based telephone system, often referred to as the public switched telephone network (PSTN). Analog wireline telephone systems typically process data in analog format directly, or in a digital representation of the analog data referred to as pulse code modulated (PCM) format. Analog wire line telephone service has traditionally been far less expensive than wireless telephone service.

To provide a complete replacement for traditional analog wire line telephone service, wireless digital telephone systems must be able to accommodate all the services and functions that are currently supported by analog wire line telephone service. One such service is fax transmission.

Although digital wireless telephone systems typically do provide fax transmission service, the interface to the fax service is generally different than that of analog telephone systems. In particular, digital wireless telephone systems process the digital data directly, rather than in the form of tones, as practiced for analog communication systems.

Because of the different interface methods, some analog telecommunication equipment can not be used with the digital wireless telephone systems. In particular, fax machines designed for use with an analog telephone system typically cannot be used with a digital wireless telephone system. Therefore, a user converting from analog wire based telephone service to digital wireless telephone service will have to consider the capital investment made in such equipment when determining the cost benefit of switching to digital wireless telephone service.

Therefore, to reduce the cost of transitioning from wire based telephone service to a digital wireless telephone service, it is desirable to provide interface to a digital wireless telephone system that works with analog based wire line telecommunication equipment. In particular, it would be desirable to provide an interface to a digital wireless telephone system that works with standard telephones and fax machines.

SUMMARY OF THE INVENTION

The present invention is a novel and improved method and apparatus for providing an interface to a digital wireless telephone system compatible with standard analog wire line telephones and analog wire line fax machines. During a telephone call, a fax detector monitors the incoming data for fax signals. If a fax is detected, the data processor switches from processing the data as if it were voice to processing it as fax. In addition, the remote station is sent a signal notifying it to process the data as fax rather than voice.

The fax detector operates by detecting a known pattern that is present at the beginning of every fax call. During the initiation of a fax call, certain parameters are negotiated between the transmitting and the receiving fax machines. These parameters are transmitted as BFSK signals consisting of a preamble followed by the parameter data. The preamble is the known pattern which can be detected. Energy is measured in both frequencies of the BFSK signals. A decision is made by analyzing these energies and locating a specific pattern which repeats itself a sufficient number of times.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
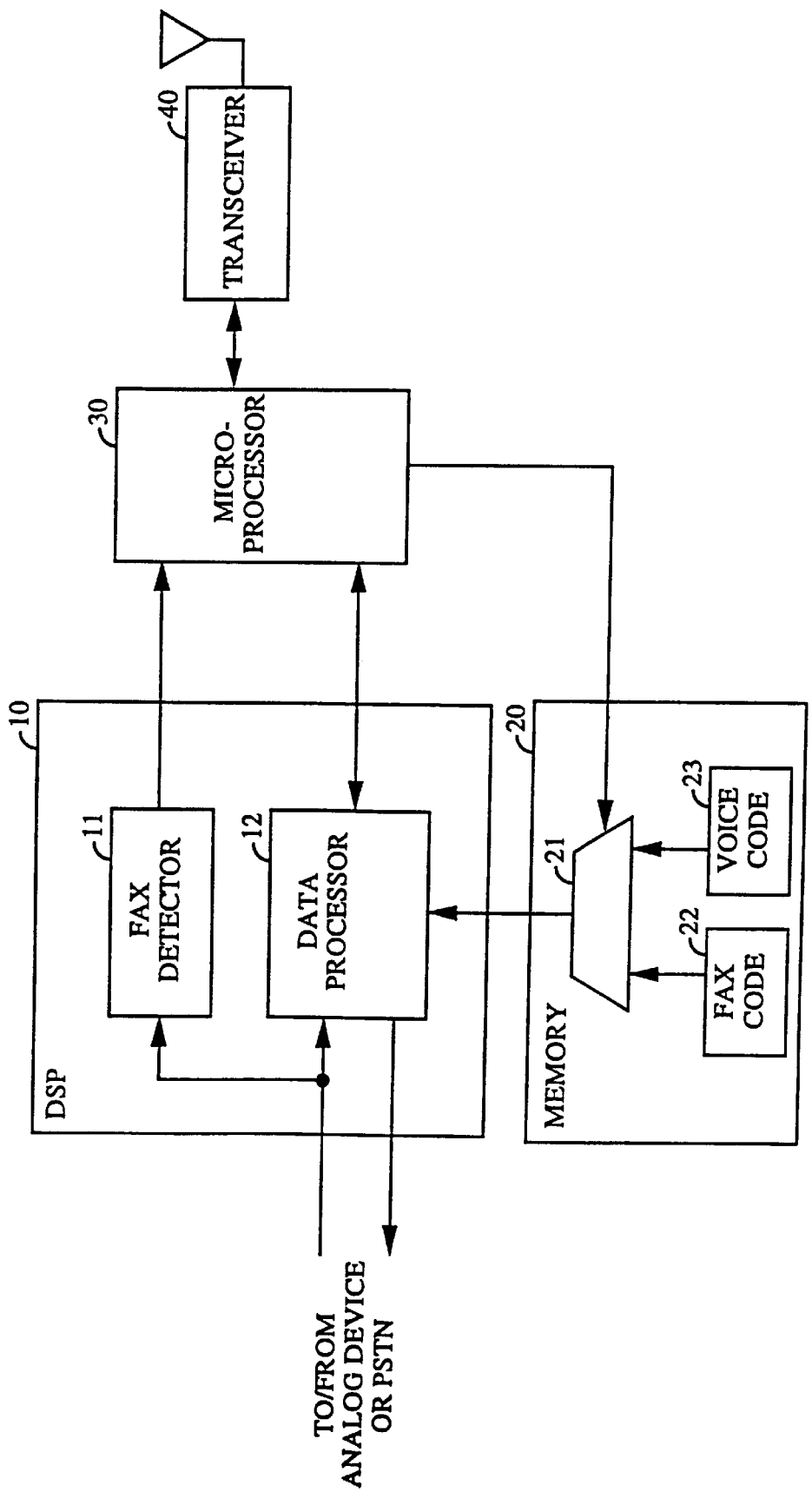
FIG. 1 is a block diagram of the digital wireless telecommunications system when configured in accordance with one embodiment of the present invention.

FIG. 1 depicts elements that are common to both the subscriber and base stations. Thus, the present invention is equally applicable when the subscriber initiates a call to the base station, or the base station initiates a call to the subscriber. For the elements considered in FIG. 1, it is only necessary to know whether the call is being initiated or received, not whether the device is a base station or a subscriber station. In the exemplary embodiment, fax detection occurs in the station which received the call.

Consider first the call initiation. Memory 20 contains code for processing fax 22 and code for processing voice 23. In the exemplary embodiment, the voice code 23 performs a variable rate code excited linear prediction (CELP) algorithm as described in detail in U.S. Pat. No. 5,414,796 entitled "variable Rate Vocoder" which is assigned to the assignee of the present invention and incorporated by reference herein. Memory 20 may be a random access memory (RAM) or read only memory (ROM) or other memory devices as are known in the art. In the exemplary embodiment, the default data processing code is set for voice. Hence, voice code 23 is loaded via memory multiplexor (mux) 21 into data processor 12, and microprocessor 30 signals to the remote station via transceiver 40 that the following call data should be processed as voice. Data samples from the local input device are processed by digital signal processor (DSP) 10. Those samples are processed by data processor 12 and also provided to fax detector 11. Results of data processor 12 are sent to microprocessor 30 where they are transmitted to the remote station via transceiver 40. The data is processed as a voice call until such time as fax detector 11 determines that the incoming data is that of a fax. Upon detection of facsimile data, fax detector 11 provides a signal indicating the detection to microprocessor 30. Following receipt of the fax detection signal from fax detector 11, microprocessor 30 signals to the remote station (not shown) via transceiver 40 that the following call data should be processed as fax, no longer as voice. In addition, microprocessor 30 provides a signal to DSP 10 and memory 20 which causes the fax code 22 to be provided through mux 21 to data processor 12. Data processor 12, now loaded with fax code, also processes data received from the remote station via transceiver 40 and microprocessor 30. Results of that processing are sent to the local output device which, in the exemplary embodiment, is a speaker for voice data and a connected fax machine for fax data (not shown).

In the exemplary embodiment, voice code 23 or fax code 22 is selectively loaded into DSP 10. In an alternative embodiment, both fax code 22 and voice code 23 may reside concurrently in DSP 10. Another alternative embodiment may include parallel processors, one for voice, the other for fax, where the output of one processor is selected based on the type of call being processed. These and other alternatives obvious to those skilled in the art employ the principles defined in this invention.

Now consider a received call. Microprocessor 30 receives instructions indicating how to process the call data from the remote station via transceiver 40. Microprocessor 30 provides a signal to DSP 10 and memory 20. In response to the signal from microprocessor 30, data processor 12 is loaded with fax code 22 or voice code 23 via memory mux 21.

In the exemplary embodiment, the subscriber station local samples come from and go to an external (to the subscriber station) analog device such as a fax machine or fax modem connected through an interface circuit which converts the analog signal into digital samples and vice versa. The base station local device is the Public Switched Telephone Network (PSTN).

Fax calls must conform to behavior as specified in "ITU-T Recommendation T.30: Procedures For Document Facsimile Transmission in the General Switched Telephone Network" incorporated herein by reference. In the exemplary embodiment, parameter negotiation at the beginning of a fax call is accomplished as specified by "CCITT Recommendation V.21:300 BPS Duplex Modem Standardized For Use in the General Switched Telephone Network (GSTN)" incorporated herein by reference.

At the start of a fax call, messages are exchanged between the fax machines according to V.21. These V.21 messages communicate parameters such as capabilities of the fax machines and rates supported. The V.21 messages are BFSK modulated signals where 1650 Hz represents binary 1 and 1850 Hz represents binary 0. Each message consists of a preamble followed by the information specific to that message. The preamble is made up of a sequence of the pattern 0x7e repeated for 1 second within a 15% tolerance. Fax detector 11 determines a call is fax by detecting this preamble. Although the exemplary embodiment detects V.21 signals in order to detect fax, this invention can also be used to detect other signals including non-fax V.21 signals and, with slight modification, non-V.21 signals as well. However, the simplicity of the detector and its reliability derives from intimate knowledge of fax protocols and the nature in which V.21 signals are used in fax calls. The spectral characteristics of the V.21 message exhibit a pattern that is repetitive and stationary over a sufficient amount of time so as to be detected by fax detector 11. Also, the pattern is sufficiently unique that false detects are highly unlikely. The V.21 message is repeated for a duration of up to 30 seconds. This allows for data processor 12 to be replaced with fax code 22 in time to process the information in the V.21 message once fax detector 11 determines a fax call is beginning.

Figure 2:
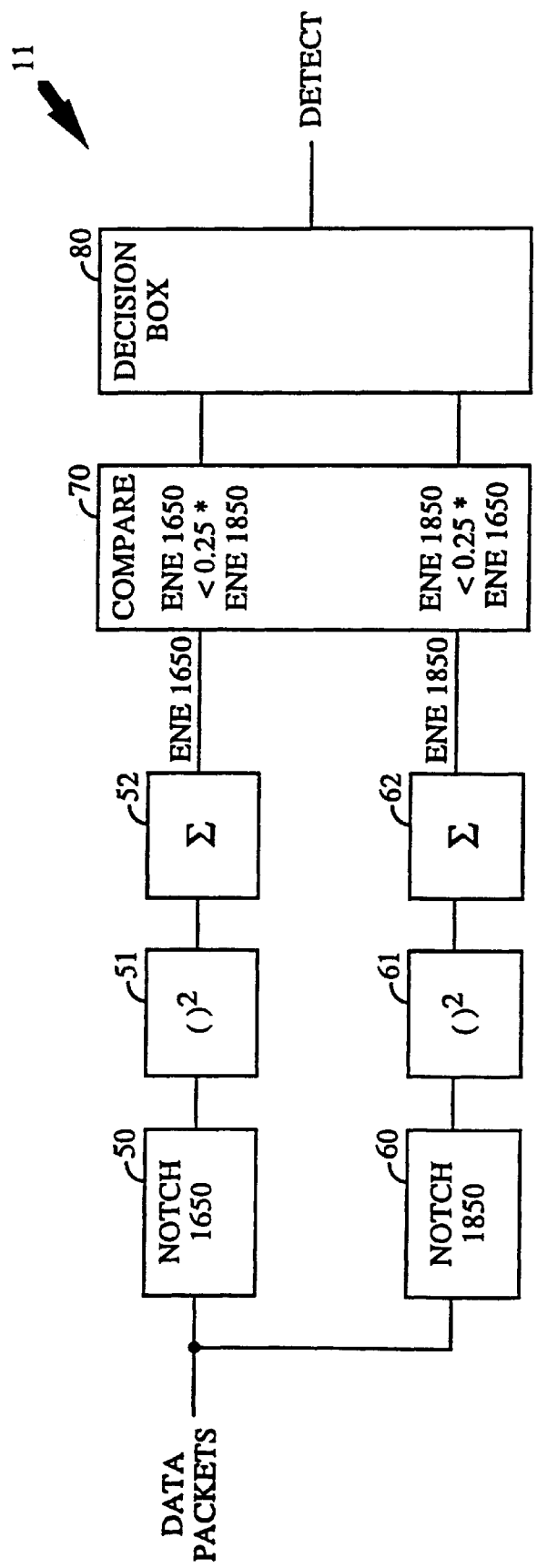
FIG. 2 is a block diagram of one embodiment of the fax detector.

FIG. 2 shows the block diagram of fax detector 11. Input samples are filtered by notch filter 50 at 1650 KHz, squared by squaring means 51, and summed up by accumulator 52 to produce the energy at 1650 Hz (ene1650). In like fashion, input samples are filtered by notch filter 60 at 1850 Hz, squared by squaring means 61, and summed up by accumulator 62 to produce the energy at 1850 Hz (ene1850). In the preferred embodiment, the sampling rate is 8 MHz and the energy measurements are sums of 20 samples. Comparator 70 compares ene1650 ; with ene1850 and produces two outputs: one signifying whether ene1650 is less than a fraction of ene1850, and one signifying whether ene1850 is less than a fraction of ene1650. In the preferred embodiment, the fraction used in both comparisons is 0.25. The outputs of comparator 70 go into decision box 80, where a detection decision is made based on the present and some of the past comparison values.

Decision box 80 looks for 6, 7, or 8 consecutive frames where the 1650 Hz energy measurements are less than one quarter of their corresponding 1850 Hz energy measurements, followed by 3 or 4 frames where that condition is not true and wherein at least one of those 3 or 4 frames has the energy at 1850 Hz less than one quarter of the corresponding 1650 Hz energy measurement. Only if this sequence is consecutively repeated 8 times will decision box 80 declare that V.21 signals, and hence fax signals, are detected. Values associated with comparison thresholds, number of consecutive energy measurements, sampling rates, samples per energy calculation, etc. can all be readily modified by someone skilled in the art to accomplish the same result.

Figure 3:
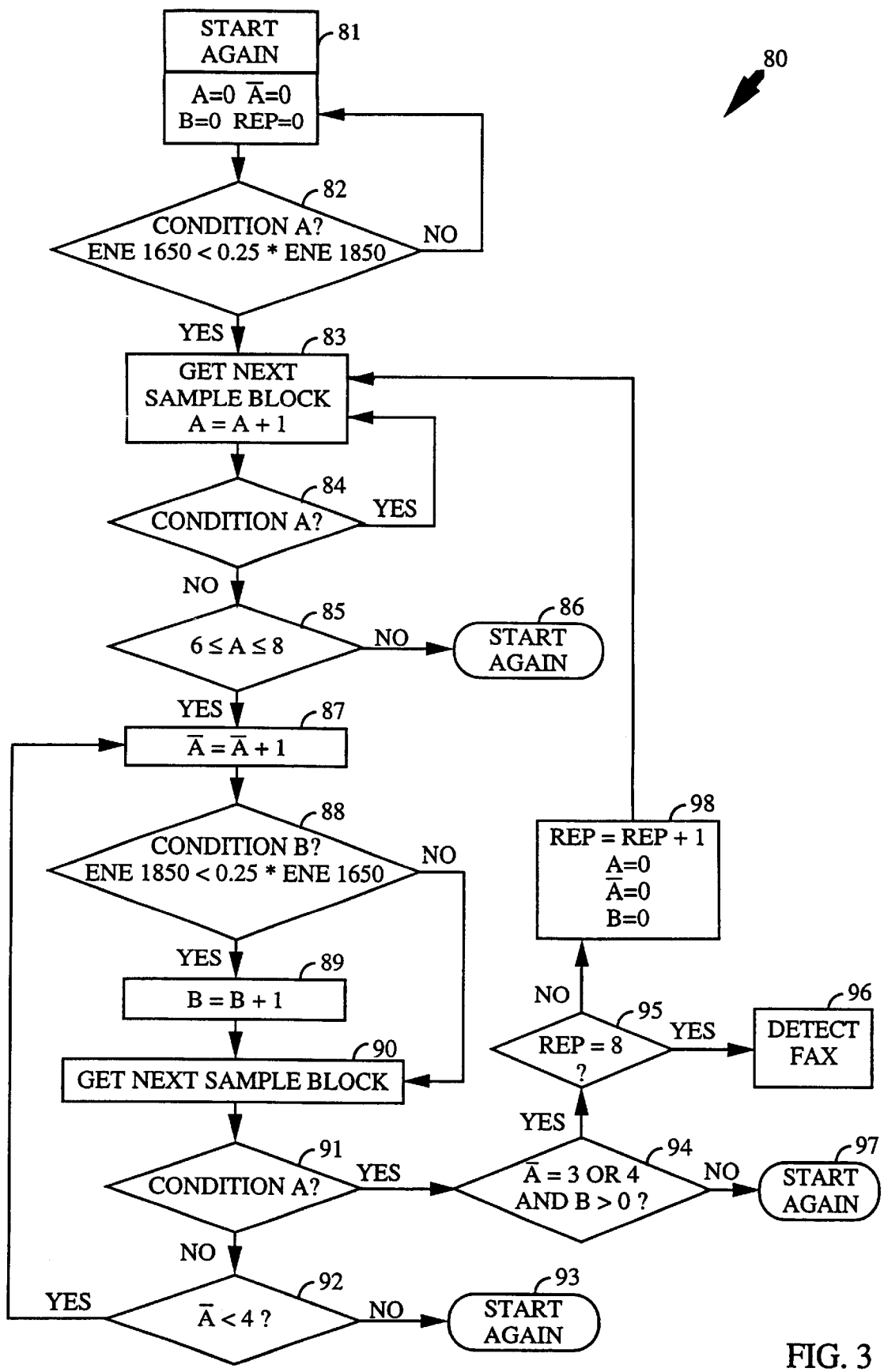
FIG. 3 is a flow chart illustrating the operation of the decision making element of the fax detector when configured in accordance with one embodiment of the present invention.

The flow chart in FIG. 3 depicts the decision making process as utilized by the preferred embodiment of decision box 80. Start in 81, labeled "START AGAIN". There, initialize variables A, $\overline{A}$, B, and Rep to zero and proceed to 82. In 82, if ene1650<0.25* ene1850 (defined as condition A) is true, proceed to 83. Otherwise, return to 81, "START AGAIN". In 83, increment A by one, get the next sample, and proceed to 84. In 84, if condition A is true, loop back to 83. Otherwise, proceed to 85. In 85, if $6 \leq A \leq 8$, proceed to 87. Otherwise, proceed to 86 and then back to 81, "START AGAIN". In 87, increment $\overline{A}$ by one and proceed to 88. In 88, if ene1850<0.25* ene1650 (defined as condition B), proceed to 89. Otherwise, jump ahead to 90. In 89, increment B by one and proceed to 90. In 90, get the next sample and proceed to 91. In 91, if condition A is false, proceed to 92. In 92, if $\overline{A}$<4, loop back to 87. Otherwise, proceed to 93 then return to 81, "START AGAIN".

In 91, if condition A is true, proceed to 94. In 94, if $\overline{A}$=3 or 4 and B>0, proceed to 95. Otherwise, proceed to 97 then return to 81, "START AGAIN".

In 95, if Rep=8, proceed to 96 and signal that a fax is detected. Otherwise, proceed to 98. In 98, increment rep by one, reset A, $\overline{A}$, and B to zero, and loop back to 83.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus comprising transceiver means for transmitting a fax mode signal when a detector means determines that a signal consists of fax data; and memory means for storing a fax processing code and a voice processing code and wherein processor means processes said signal in accordance with said fax processing code or said voice processing code in accordance with said detector means control signal.

2. An apparatus for transmitting data over a digital communications channel, comprising:

a fax detector configured to detect whether a signal contains fax data;

a multiplexer, coupled to the fax detector, configured to select a source of executable code for processing the signal in accordance with the fax detector detection;

a processor, coupled to the multiplexer, configured to processes the signal by executing the executable code selected by the multiplexer; and a transceiver coupled to the fax detector and the processor.

3. The apparatus of claim 2 wherein the multiplexer is configured to select a source of executable code for processing the signal in accordance with a data mode signal received by the transceiver.

4. The apparatus of claim 2 wherein the fax detector is configured to detect whether a signal contains fax data in accordance with V.21 preamble message protocol.

5. The apparatus of claim 2 wherein the fax detector comprises:

a first subband energy calculator which calculates first subband energy values;

a second subband energy calculator which calculates second subband energy values; and a processor which receives the first subband energy values and the second subband energy values and determines, in accordance with statistics of said first subband energy values and said second subband energy values, whether the signal contains fax data.

6. The apparatus of claim 2 wherein the transceiver transmits a data mode signal in accordance with the fax detector detection.

7. The apparatus of claim 2 wherein the source of executable code comprises:

a source of executable code for processing the signal as a fax data; and a source of executable code for processing the signal as a service option different from fax data.

8. The apparatus of claim 7 wherein the different service option comprises voice data.

9. A method for communicating data over a digital communications channel, comprising:

determining whether a signal contains fax data;

selecting a source of executable code for processing the signal in accordance with the determination; and processing the signal by executing the selected executable code.

10. The method of claim 9 wherein the processing the signal by executing the selected executable code comprises processing the signal as fax data.

11. The method of claim 9 wherein the determining comprises determining whether the signal contains a V.21 preamble message protocol.

12. The method of claim 9 wherein the determining comprises:

calculating first subband energy values;

calculating second subband energy values; and determining, in accordance with statistics of said first subband energy values and said second subband energy values, whether the signal contains fax data.

13. The method of claim 7 further comprising transmitting a data mode signal in accordance with the determination.

14. The method of claim 9 wherein the determining comprises determining whether the signal contains fax data in accordance with a data mode signal received by the transceiver.

15. The method of claim 9 wherein the processing the signal by executing the selected executable code comprises processing the signal as a service option different from fax data.

16. The method of claim 15 wherein the processing the signal as a service option different from fax data comprises processing the signal as voice data.

* * * * *